United States Patent
Baldwin et al.

(10) Patent No.: US 10,785,227 B2
(45) Date of Patent: Sep. 22, 2020

(54) IMPLEMENTING DATA SECURITY WITHIN A SYNCHRONIZATION AND SHARING ENVIRONMENT

(71) Applicant: International Business Machines Corporation, Armonk, NY (US)

(72) Inventors: Duane M. Baldwin, Rochester, MN (US); Sasikanth Eda, Pune (IN); Sandeep R. Patil, Pune (IN); Sachin C. Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 15/398,638

(22) Filed: Jan. 4, 2017

(65) Prior Publication Data
US 2018/0191727 A1    Jul. 5, 2018

(51) Int. Cl.
| | |
|---|---|
| *H04L 29/06* | (2006.01) |
| *G06F 16/176* | (2019.01) |
| *H04L 29/08* | (2006.01) |
| *H04L 12/26* | (2006.01) |
| *G06F 16/178* | (2019.01) |
| *H04L 12/24* | (2006.01) |

(52) U.S. Cl.
CPC .......... *H04L 63/102* (2013.01); *G06F 16/176* (2019.01); *G06F 16/178* (2019.01); *H04L 43/0876* (2013.01); *H04L 63/105* (2013.01); *H04L 63/1408* (2013.01); *H04L 63/1433* (2013.01); *H04L 67/1095* (2013.01); *H04L 41/5003* (2013.01); *H04L 67/06* (2013.01)

(58) Field of Classification Search
CPC ............... H04L 63/102; H04L 43/0876; H04L 67/1095; H04L 41/5003; H04L 67/06; H04L 63/105; H04L 63/1433; G06F 17/30174; G06F 16/176; G06F 16/178
See application file for complete search history.

(56) References Cited

U.S. PATENT DOCUMENTS

| | | | |
|---|---|---|---|
| 8,756,247 B2 | 6/2014 | Kuo et al. | |
| 8,990,955 B2 | 3/2015 | Hymel et al. | |
| 2007/0101400 A1* | 5/2007 | Freeman | H04L 9/0841 726/2 |
| 2009/0235359 A1* | 9/2009 | Abdulhayoglu | H04L 63/0272 726/25 |
| 2010/0037324 A1* | 2/2010 | Grant | G06F 21/554 726/27 |
| 2010/0198871 A1 | 8/2010 | Stiegler et al. | |

(Continued)

OTHER PUBLICATIONS

Information Technology Labaratory, "NIST Cloud Computing Program," Dec. 9, 2013, pp. 1-2, Retrieved From http://www.nist.gov/itl/cloud/.

(Continued)

*Primary Examiner* — Robert B Leung
(74) *Attorney, Agent, or Firm* — Zilka-Kotab, P.C.

(57) ABSTRACT

A computer-implemented method according to one embodiment includes receiving a request to share predetermined data with a device, identifying the predetermined data as sensitive, calculating a current security level for the device, and conditionally sharing the predetermined data with the device, based on the current security level for the device.

24 Claims, 11 Drawing Sheets

(56) References Cited

U.S. PATENT DOCUMENTS

| | | | |
|---|---|---|---|
| 2011/0078197 A1* | 3/2011 | Zurko | H04L 63/104 707/783 |
| 2012/0185910 A1 | 7/2012 | Miettinen et al. | |
| 2013/0318630 A1* | 11/2013 | Lam | G06F 21/60 726/28 |
| 2014/0047560 A1 | 2/2014 | Meyer et al. | |
| 2014/0068706 A1* | 3/2014 | Aissi | G06F 21/6254 726/1 |
| 2015/0047057 A1* | 2/2015 | Adams | G06F 21/6218 726/28 |
| 2015/0222606 A1* | 8/2015 | Yan | H04L 9/0847 713/171 |
| 2016/0088017 A1* | 3/2016 | Green | H04L 63/20 726/1 |
| 2017/0193041 A1* | 7/2017 | Fuchs | G06F 17/30442 |
| 2017/0264619 A1* | 9/2017 | Narayanaswamy | G06F 17/30864 |
| 2018/0084044 A1* | 3/2018 | Nichols | H04L 67/1095 |

OTHER PUBLICATIONS

Well et al., "The NIST Definition of Cloud Computing," NIST, Information Technology Laboratory, Version 15, Oct. 7, 2009, pp. 1-2.
Well et al., "The NIST Definition of Cloud Computing," NIST, Special Publication 800-145, 2011, pp. 1-7.

* cited by examiner

IMPLEMENTING DATA SECURITY WITHIN A SYNCHRONIZATION AND SHARING ENVIRONMENT

BACKGROUND

The present invention relates to data security, and more specifically, this invention relates to implementing data security within a data synchronization and sharing environment.

File synchronization and sharing is a popular way to send and receive data across multiple different devices. However, current data synchronization and sharing systems do not account for security measures that are implemented by client devices that receive shared data. As a result, client devices having inadequate security measures may be given access to shared data, which may compromise the security of such data. There is therefore a need to improve the security measures implemented within data synchronization and sharing infrastructures.

SUMMARY

A computer-implemented method according to one embodiment includes receiving a request to share predetermined data with a device, identifying the predetermined data as sensitive, calculating a current security level for the device, and conditionally sharing the predetermined data with the device, based on the current security level for the device.

According to another embodiment, a computer program product for implementing data security within a synchronization and sharing environment comprises a computer readable storage medium having program instructions embodied therewith, wherein the computer readable storage medium is not a transitory signal per se, and where the program instructions are executable by a processor to cause the processor to perform a method comprising receiving, utilizing the processor, a request to share predetermined data with a device, identifying the predetermined data as sensitive, utilizing the processor, calculating, utilizing the processor, a current security level for the device, and conditionally sharing, utilizing the processor, the predetermined data with the device, based on the current security level for the device.

A system according to another embodiment includes a processor, and logic integrated with the processor, executable by the processor, or integrated with and executable by the processor, where the logic is configured to receive a request to share predetermined data with a device, identify the predetermined data as sensitive, calculate a current security level for the device, and conditionally share the predetermined data with the device, based on the current security level for the device.

A computer-implemented method according to another embodiment includes identifying a file to be used within a synchronization and sharing system, adding a first attribute of the file when it is determined that the file is confidential, adding a second attribute of the file when it is determined that the file is important, and controlling access to the file within the synchronization and sharing system when it is determined that one or more of the first attribute and the second attribute have been added to the file.

A computer-implemented method according to another embodiment includes obtaining permission to scan a client device, identifying operating system (OS) access security measures implemented by the client device, identifying file synchronization and sharing application access security measures implemented by the client device, determining a security level for the client device, based on the OS access security measures and the file synchronization and sharing application access security measures, and controlling an access of the client device to files within a file synchronization and sharing system, based on the security level for the client device.

Other aspects and embodiments of the present invention will become apparent from the following detailed description, which, when taken in conjunction with the drawings, illustrate by way of example the principles of the invention.

DETAILED DESCRIPTION

Figure 1:
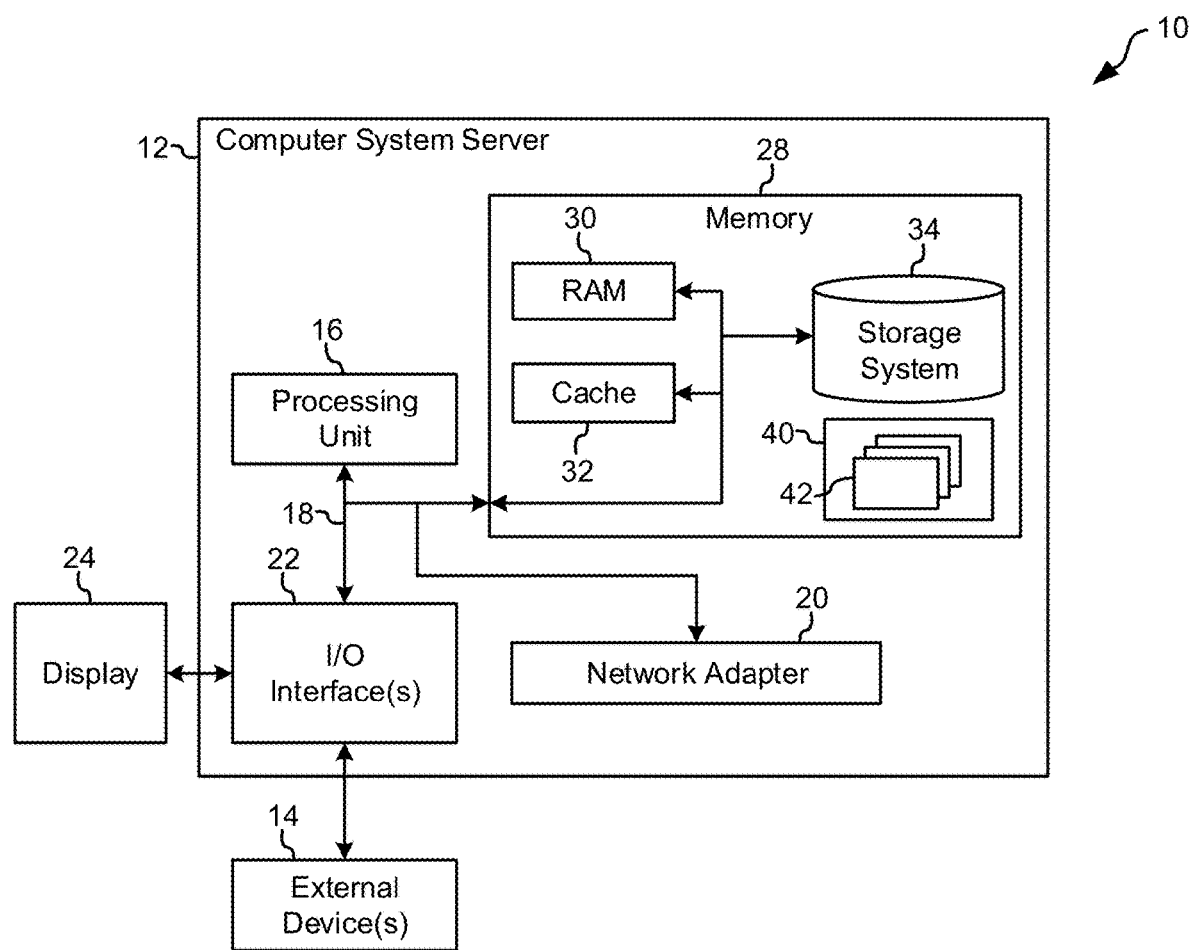
FIG. 1 depicts a cloud computing node according to an embodiment of the present invention.

The following description discloses several preferred embodiments of systems, methods and computer program products for implementing data security within a synchronization and sharing environment. Various embodiments provide a method for identifying data to be shared with a device, determining a security level for that data, determining a security level for the device, and conditionally sharing the data with the device, based on the security level for both the data and the device.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing data security within a synchronization and sharing environment.

In one general embodiment, a computer-implemented method includes receiving a request to share predetermined data with a device, identifying the predetermined data as sensitive, calculating a current security level for the device, and conditionally sharing the predetermined data with the device, based on the current security level for the device.

In another general embodiment, a computer program product for implementing data security within a synchronization and sharing environment comprises a computer readable storage medium having program instructions embodied therewith, wherein the computer readable storage medium is not a transitory signal per se, and where the program instructions are executable by a processor to cause the processor to perform a method comprising receiving, utilizing the processor, a request to share predetermined data with a device, identifying the predetermined data as sensitive, utilizing the processor, calculating, utilizing the processor, a current security level for the device, and conditionally sharing, utilizing the processor, the predetermined data with the device, based on the current security level for the device.

In another general embodiment, a system includes a processor, and logic integrated with the processor, executable by the processor, or integrated with and executable by the processor, where the logic is configured to receive a request to share predetermined data with a device, identify the predetermined data as sensitive, calculate a current security level for the device, and conditionally share the predetermined data with the device, based on the current security level for the device.

In another general embodiment, a computer-implemented method includes identifying a file to be used within a synchronization and sharing system, adding a first attribute of the file when it is determined that the file is confidential, adding a second attribute of the file when it is determined that the file is important, and controlling access to the file within the synchronization and sharing system when it is determined that one or more of the first attribute and the second attribute have been added to the file.

In another general embodiment, a computer-implemented method includes obtaining permission to scan a client device, identifying operating system (OS) access security measures implemented by the client device, identifying file synchronization and sharing application access security measures implemented by the client device, determining a security level for the client device, based on the OS access security measures and the file synchronization and sharing application access security measures, and controlling an access of the client device to files within a file synchronization and sharing system, based on the security level for the client device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
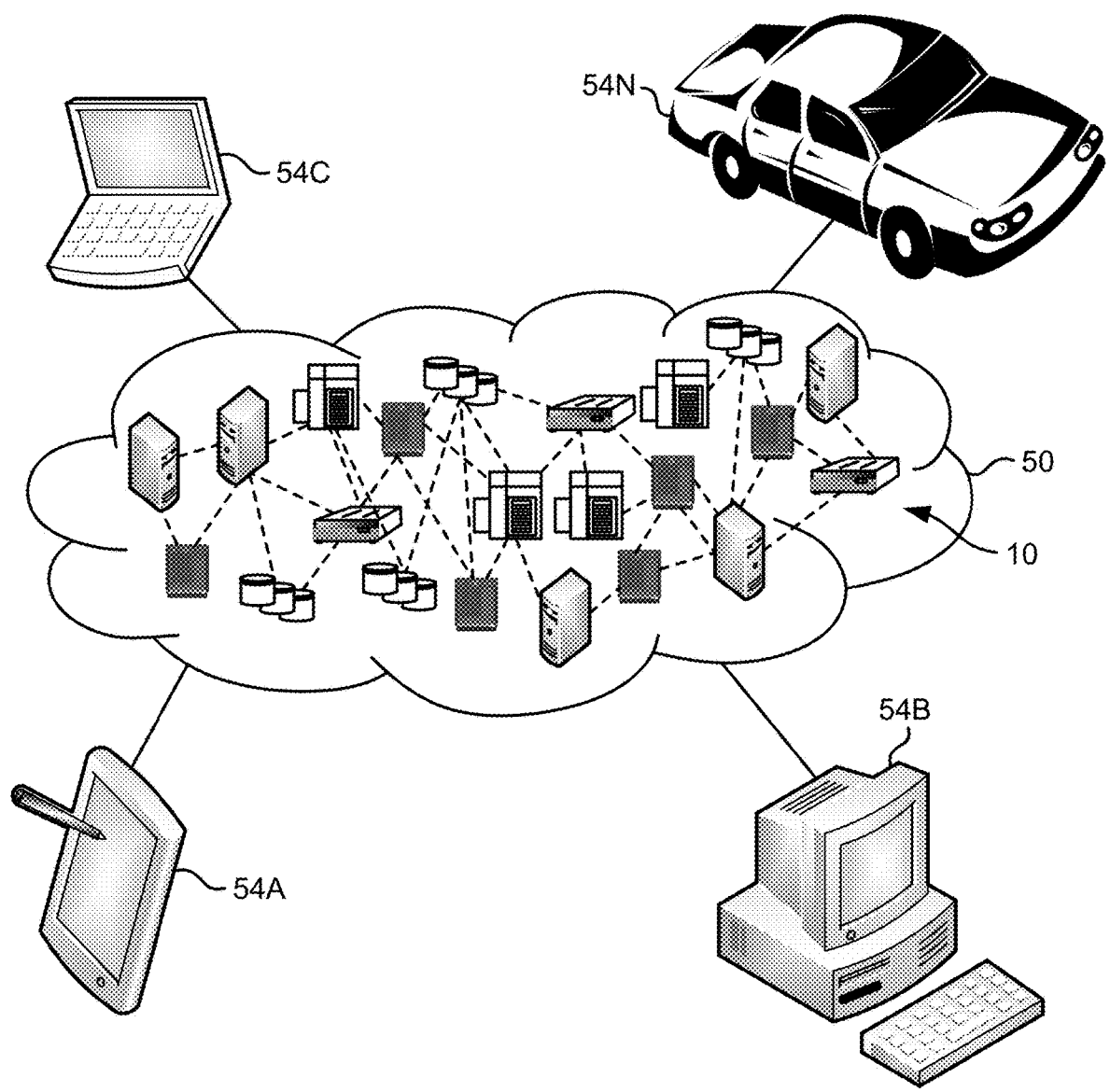
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
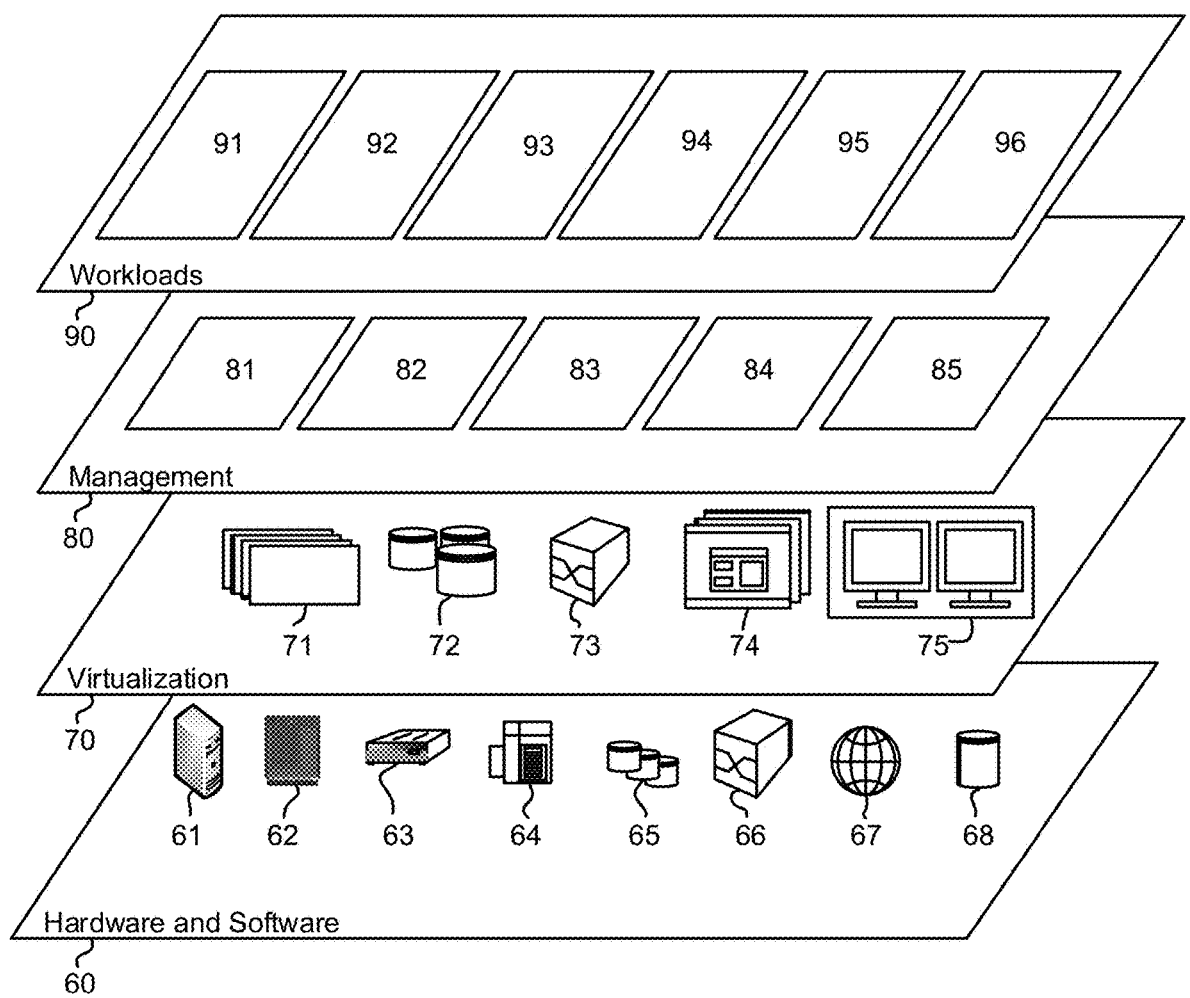
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data synchronization and sharing 96.

Figure 4:
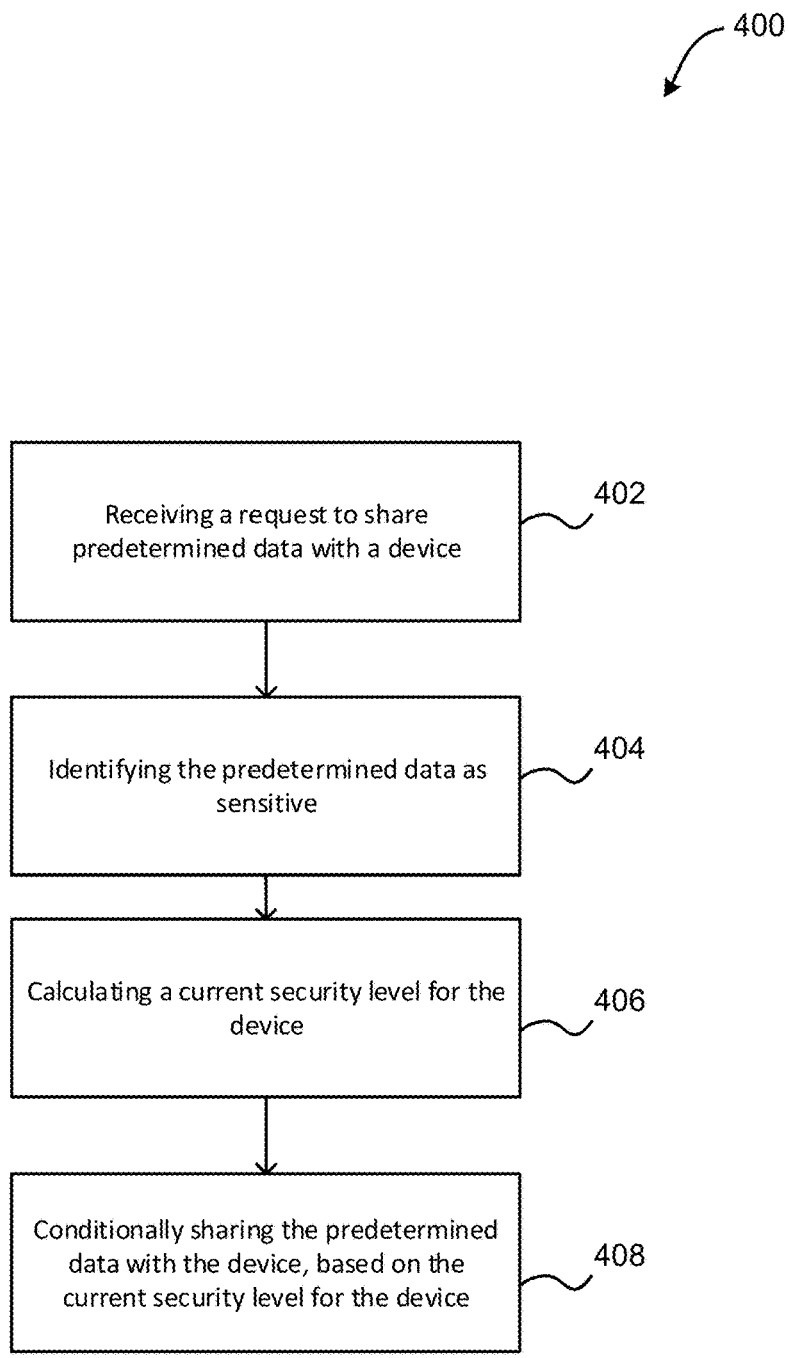
FIG. 4 illustrates a method for implementing data security within a synchronization and sharing environment, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request to share predetermined data with a device is received. In one embodiment, the data may include one or more files (e.g., one or more pictures, text files, video, audio, etc.), one or more applications, etc. In another embodiment, the device may include a computing device such as a mobile computing device (e.g., a smart phone, a laptop computer, etc.), a desktop computing device, a server computing device, etc.

Additionally, in one embodiment, the data may be stored at a file sharing and synchronizing system. For example, the data may be stored within a system for sharing and synchronizing data between a plurality of different devices. In another embodiment, the different devices may each be associated with (e.g., registered to, etc.) an account within the file sharing and synchronizing system. In yet another embodiment, the different devices may each have a software client installed within the device to implement file sharing and synchronizing within the system.

For example, the file sharing and synchronizing system may perform automatic or manual synchronization of file changes utilizing a synchronization client installed on each of the plurality of different devices. The synchronization client may also offer access to browse, download, edit, and/or upload files and may automatically synchronize files with a file synchronization and share server. In one embodiment, the device associated with the share request may be included within the plurality of different devices of the file sharing and synchronizing system. In another embodiment, the data may be stored at one of the plurality of different devices of the file sharing and synchronizing system. In yet another embodiment, the file sharing and synchronizing system may be implemented within a cloud computing environment.

Also, in one embodiment, the file sharing and synchronizing system may provide access to the predetermined data across a variety of different platforms (e.g., operating systems, web platform, etc.). In another embodiment, the file sharing and synchronizing system may allow sharing of data between multiple different user accounts. The file sharing and synchronizing system may also perform encryption and decryption of data at a server side of the system, and may implement security measures (e.g., secure sockets layer (SSL), etc.) during data communication. In yet another embodiment, the file synchronization and share server may be responsible for managing one or more elements of storage associated within the file sharing and synchronizing system (e.g., provisioning, metering, logging, setting policies, creating backups, user management etc.).

Additionally, in one embodiment, the predetermined data may be associated with an account within the file sharing and synchronizing system. For example, the predetermined data may be created, uploaded, and/or owned by a user of the account within the system. In another embodiment, the request may include a request to synchronize and/or share the predetermined data with the device utilizing the file sharing and synchronizing system.

Further, in one embodiment, the request may be sent from the device. For example, a user of the device may send the request to the system utilizing a software file sharing and synchronizing client installed on the device. In another embodiment, the request may be created by an account associated with the data. For example, the creator, uploader, and/or owner of the data may send a request to the system to share the data with the device.

Further, as shown in FIG. 4, method 400 may proceed with operation 404, where the predetermined data is identified as sensitive. In one embodiment, the predetermined data may be identified as sensitive in response to determining that the data is one or more of important and confidential. In another embodiment, the predetermined data may be determined to be important by analyzing one or more factors.

For example, a number of times a creator, uploader, and/or owner of the predetermined data has viewed the predetermined data may be identified and analyzed as a factor. In another example, an existence of one or more replicas of the predetermined data may be identified and analyzed as a factor. In yet another example, a sharing of the predetermined data (e.g., utilizing social media, etc.) may be identified and analyzed as a factor. In still another example, an existence of multiple versions of the predetermined data may be identified and analyzed as a factor. In another example, an existence of a tag (e.g., a predetermined header, a flag, etc.) indicating the that predetermined data is important may be identified and analyzed as a factor.

In addition, in one embodiment, the predetermined data may be determined to be confidential by analyzing one or more factors. For example, a time and date that the predetermined data was generated may be identified and analyzed as a factor. In another example, an identification that the predetermined data includes sensitive personal information may be identified and analyzed as a factor. In yet another example, an existence of a tag indicating that the predetermined data is confidential may be identified and analyzed as a factor.

Furthermore, in one embodiment, when, after analyzing the one or more factors, it is determined that the predetermined data is one or more of important and confidential, the predetermined data may be marked as sensitive. For example, the predetermined data may be marked utilizing an extended file attribute (XATTR) setting, a field association, etc. In another embodiment, the sensitive marking may be viewed by the creator, uploader, and/or owner of the predetermined data within the file sharing and synchronizing system. In yet another embodiment, the predetermined data may be identified as sensitive by the file sharing and synchronizing system.

Further still, in one embodiment, the predetermined data may be automatically labeled as sensitive/important/normal by a device that creates the predetermined data, depending on the associated security level of that device. For example, when the predetermined data is created on a device that has a security level determined to be high, that security level may be automatically applied as a tag to the predetermined data, or the predetermined data may be automatically labeled as important and/or confidential. In another embodiment, the label that was automatically applied to the predetermined data may be changed and/or removed by the user that created the predetermined data (e.g., before/during synchronization and/or sharing, etc.).

In addition, as shown in FIG. 4, method 400 may proceed with operation 406, where a current security level is calculated for the device. In one embodiment, the current security level may be calculated for the device in response to the identification of the predetermined data as sensitive. In another embodiment, the current security level may be calculated by first requesting permission to identify security and access mechanisms of the device, where the request is made to the device and/or a user of the device.

Also, in one embodiment, when permission to identify security and access mechanisms of the device are obtained, calculating the security level for the device may include collecting one or more security and/or login mechanisms used to access an operating system (OS) of the device. In another embodiment, calculating the security level for the device may include collecting one or more security and/or login mechanisms used to access a file sharing and synchronizing client of the device. For example, the login mechanism used to access a file sharing and synchronizing client application of the device may be identified.

Additionally, in one embodiment, calculating the current security level of the device may also include rating the OS and system access security and/or login mechanisms. Security and login mechanisms may include any procedure that is performed to secure the device and/or log into an application of the device. For example, security and login mechanisms may include a confirmation of one or more passwords, a confirmation of biometric identification (e.g., fingerprints, optic scanning, ear shape, etc.), a confirmation of a photo and/or image by performing analysis, a confirmation of a personal authentication key, a confirmation of random security questions, a confirmation of a user's voice, etc.

For example, each identified security and/or login mechanism may be given a rating representative of its level of security. In another example, mechanisms including one or more of a weak password for OS access, no password policy for OS access, automatic sign in for system access, and a lack of device screen locking may result in a calculation of a low security level for the device.

In yet another example, mechanisms including one or more of a password policy for OS access, a password based screen unlock for a device, and password protection for system access may result in a calculation of a medium security level for the device. In still another example, mechanisms including one or more of fingerprint security for OS and system access and pattern based device unlocking may result in a calculation of a high security level for the device.

Further still, as shown in FIG. 4, method 400 may proceed with operation 408, where the predetermined data is conditionally shared with the device, based on the current security level for the device. In one embodiment, the predetermined data may be shared with the device when it is determined that the current security level of the device exceeds a predetermined threshold (e.g., is a medium security level or stronger, etc.). In another embodiment, sharing the predetermined data with the device may include allowing a synchronization of the predetermined data by the device, allowing a sharing of the predetermined data with the device, etc.

Further still, in one embodiment, the predetermined data may not be shared with the device when it is determined that the current security level of the device does not meet a predetermined threshold (e.g., is a low security level, etc.). In another embodiment, when the predetermined data is not shared with the device, one or more of the device, a user account associated with the device, and a creator, uploader, and/or owner of the data may be notified. In yet another embodiment, one or more of the device and a user account associated with device may also be given details of current security level of the device, as well as one or more suggestions on how to improve the current security level of the device so that the predetermined data may be shared with the device.

In this way, a security mechanism may be implemented within a file sharing and synchronizing system, such that only devices having a predetermined security level can access sensitive data within the system.

Figure 5:
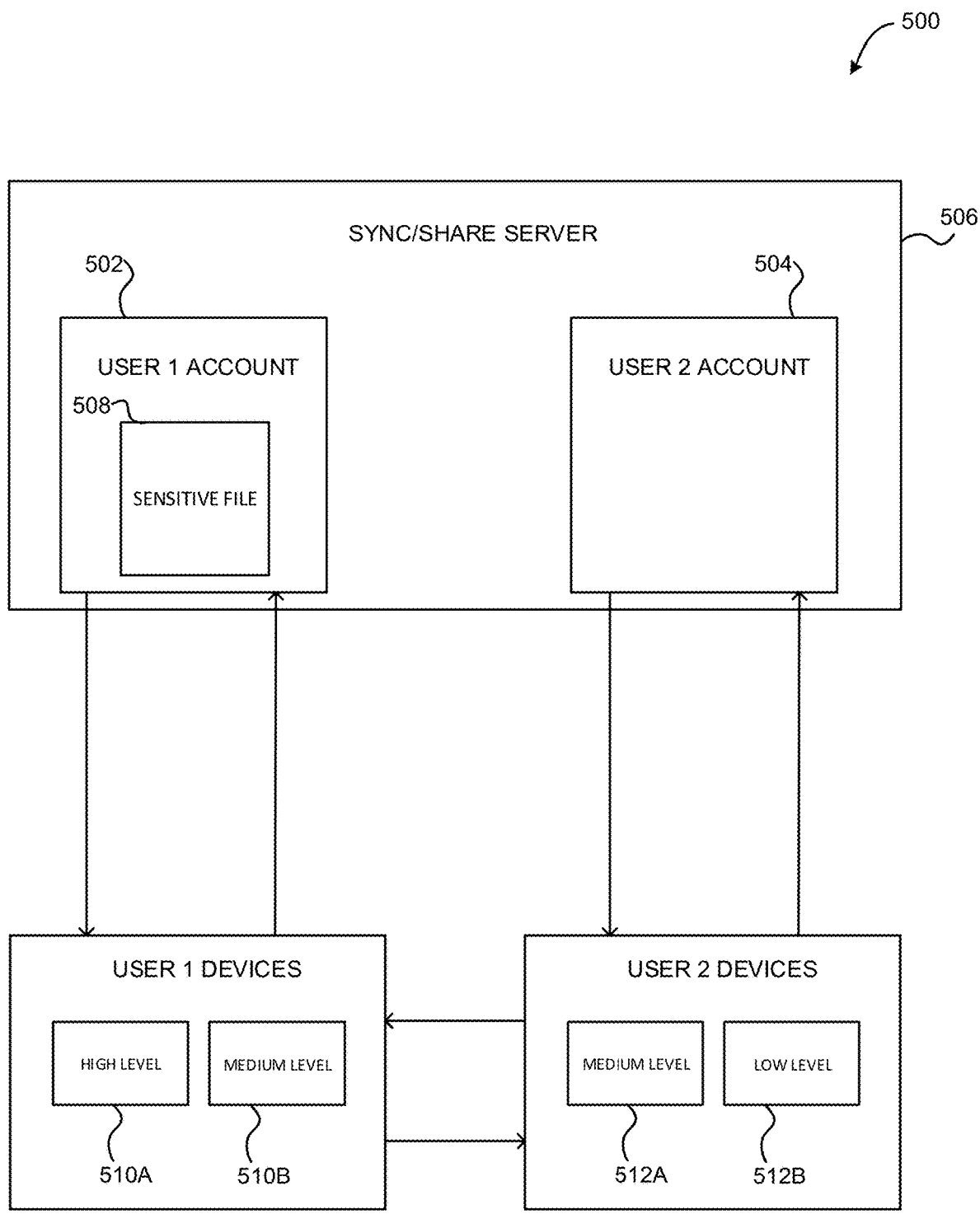
FIG. 5 illustrates a representation of an exemplary file synchronization and share architecture, in accordance with one embodiment.

Now referring to FIG. 5, a representation 500 of an exemplary file synchronization and share architecture is shown, according to one embodiment. As shown, a first user account 502 and a second user account 504 are registered within a file synchronization and share server 506. Additionally, a file 508 is stored in association with the first user account 502 within the file synchronization and share server 506. For example, the file 508 may be uploaded to a storage area within the file synchronization and share server 506 that is reserved for the first user account 502. file sync and share application basically comprises of two components known as "sync server" and "sync clients". The file synchronization and share server 506 may be responsible for managing one or more elements of storage associated at the back-end of the architecture (e.g., provisioning, metering, logging, setting policies, creating backups, user management etc.).

Further, in one example, after the file 508 is uploaded, it may be determined to be sensitive. For instance, the file synchronization and share server 506 (or a user of the server 506) may determine that the file 508 is one or more of important and confidential, and may label the file 508 as sensitive as a result. In another example, the file synchronization and share server 506 (or a user of the server 506) may determine that devices need a minimum of a medium security level to have access to the file 508.

Further still, a first plurality of devices 510A and 510B are linked to the first user account 502. For example, the first plurality of devices 510A and 510B may be registered with the file synchronization and share server 506 and may be confirmed as being associated with the first user account 502. Also, a second plurality of devices 512A and 512B are linked to the second user account 504. For example, the second plurality of devices 512A and 512B may be registered with the file synchronization and share server 506 and may be confirmed as being associated with the second user account 504. Both the first plurality of devices 510A and 510B and the second plurality of devices 512A and 512B may have file synchronization and share client software installed. These devices 510A, 510B, 512A, and 512B may also offer access to browse, download, edit, and upload files and may automatically sync the latest files with the file synchronization and share server 506.

In addition, in one embodiment, a request may be made to synchronize the file 508 with the first plurality of devices 510A and 510B. For example, the request may be made by one or more of the first plurality of devices 510A and 510B or the file synchronization and share server 506. In response to the request, a security level of each of the first plurality of devices 510A and 510B is determined (e.g., by the server 506 analyzing each of the devices, etc.). For example, it may be determined that one of the devices 510A has a high security level (e.g., fingerprint security), and the other device 510B has a medium security level (e.g., password protection).

Furthermore, in one embodiment, in response to a determination that both of the first plurality of devices 510A and 510B have security levels meeting a necessary security level to access the file 508 (e.g., a medium security level), synchronization may be performed between the first plurality of devices 510A and 510B and the file synchronization and share server 506. For example, the file 508 may be sent to each of the first plurality of devices 510A and 510B.

Further still, in one embodiment, a request may be made to share the file 508 with the second plurality of devices 512A and 512B. For example, the request may be made by one or more of the first plurality of devices 510A and 510B or the second plurality of devices 512A and 512B. In response to the request, a security level of each of the second plurality of devices 512A and 512B is determined (e.g., by the server 506 analyzing each of the devices, etc.). For example, it may be determined that one of the devices 512A has a medium security level (e.g., password protection), and the other device 512B has a low security level (e.g., slide bar access).

Furthermore, in one embodiment, in response to a determination that device 512A has a security level meeting a necessary security level to access the file 508 (e.g., a medium security level), sharing may be performed between the one or more of the first plurality of devices 510A and 510B and the device 512A. For example, the file 508 may be sent to the device 512A. However, in response to a determination that device 512B has a security level below a necessary security level to access the file 508 (e.g., a medium security level), sharing may be not be allowed between the one or more of the first plurality of devices 510A and 510B and the device 512B. For example, the file 508 may not be sent to the device 512B.

In this way, the file 508 that is identified as sensitive may require a predetermined security level to access the file 508, such that the file 508 may not be synchronized or shared with devices having security levels below the predetermined security level.

Figure 6:
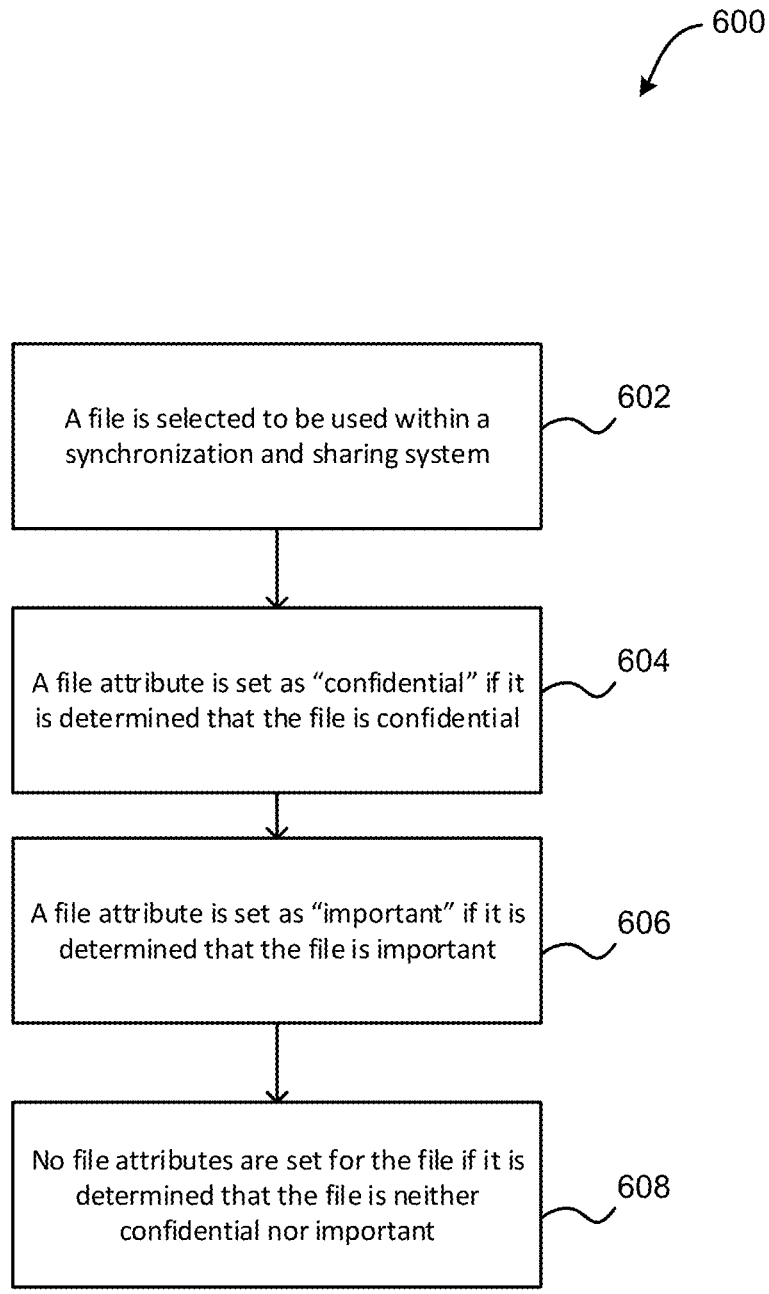
FIG. 6 illustrates a method for setting file security attributes according to one embodiment, in accordance with one embodiment.

Now referring to FIG. 6, a flowchart of a method 600 for setting file security attributes is shown according to one embodiment. The method 600 may be performed in accordance with the present invention in any of the environments depicted in FIGS. 1-3 and 5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a file is selected to be used within a synchronization and sharing system. For example, the file may be uploaded by a user of the system (e.g., a user registered with the system, etc.). For instance, the user may use a synchronization and sharing client installed on a device to upload the file. In another example, the file may be created within the system.

Additionally, method 600 may proceed with operation 604, where a file attribute is set as "confidential" if it is determined that the file is confidential. In one embodiment, the determination may be made by the synchronization and sharing system. For example, the system may identify the confidentiality of the file by analyzing one or more of a time and date at which the file was generated.

In another example, the system may identify a tag that marks the file as confidential. For instance, a user may tag the file as confidential using a feature of a synchronization and sharing client. In yet another example, the determination may be made by determining whether the file includes sensitive personal information (SPI). In another embodiment, the "confidential" file attribute may include an extended file attribute (XATTR) or a field of the file. In yet another embodiment, files that have a "confidential" file attribute may be shared and/or synchronized with devices only when those devices have a predetermined level of security implemented by the device.

Further, method 600 may proceed with operation 606, where a file attribute is set as "important" if it is determined that the file is important. In one embodiment, the determination may be made by the synchronization and sharing system. For example, the system may identify the importance of the file by analyzing a number of times an owner of the file has viewed the file. In another example, the determination may be made by analyzing a number of times an owner of the file has viewed the file.

In yet another example, the determination may be made by identifying an existence of one or more replicas and/or versions of the file. In still another example, the determination may be made by determining that the file is not shared in social media. In another example, the determination may be made by identifying one or more of a tag, a special header, a flag, etc. that indicates that the file is important. In another embodiment, the "important" file attribute may include an extended file attribute (XATTR) or a field of the file. In yet another embodiment, files that have an "important" file attribute may be shared and/or synchronized with devices only when those devices have a predetermined level of security implemented by the device.

Further still, method 600 may proceed with operation 608, where no file attributes are set for the file if it is determined that the file is neither confidential nor important. In one embodiment, files that do not have "confidential" or "important" file attributes may be shared and/or synchronized with devices regardless of a level of security implemented by the device.

Figure 7:
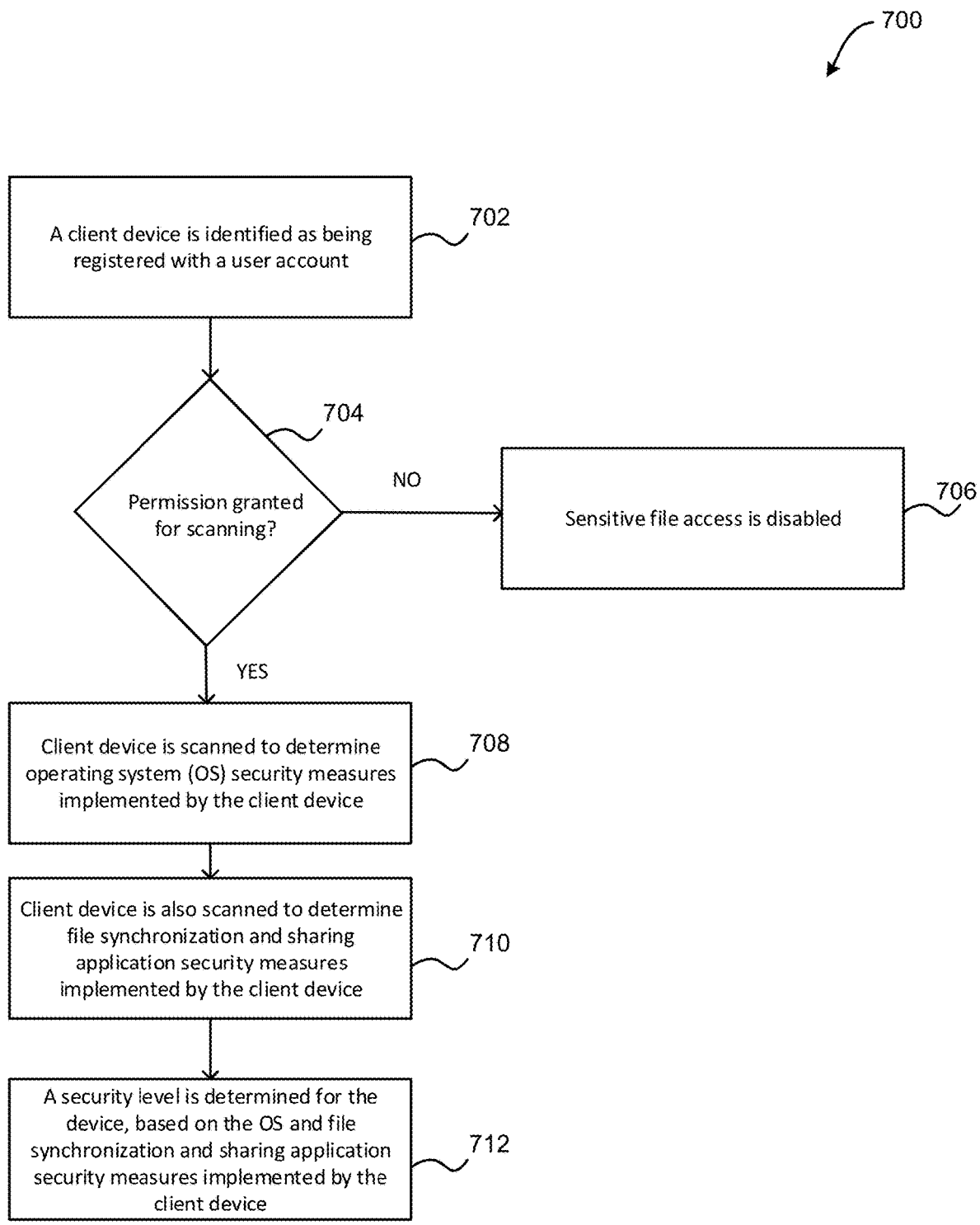
FIG. 7 illustrates a method for determining a device security level, in accordance with one embodiment.

Now referring to FIG. 7, a flowchart of a method 700 for determining a device security level is shown according to one embodiment. The method 700 may be performed in accordance with the present invention in any of the environments depicted in FIGS. 1-3 and 5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a client device is identified as being registered with a user account. In another embodiment, the user account may include an account within a file synchronization and share system. In yet another embodiment, the client device may be registered by entering details of the client device into a file synchronization and share system, in association with the user account.

Additionally, in one embodiment, the client device may have software installed within the device to communicate with the file synchronization and share system. For example, a file synchronization and share server may communicate with the client device via the software installed within the device.

Further, method 700 may proceed with decision 704, where it is determined whether permission is granted for scanning the client device. In one embodiment, permission to scan the client device may be requested by a component of the file synchronization and share system (e.g., a file synchronization and share server, etc.). For example, a server may send the request to the client device. In another embodiment, permission may be granted or denied in response to the request. For example, the client device may automatically grant or deny permission based on one or more predetermined factors. In another example, the client device may present the request to a user using a graphical user interface (GUI), and the user may grant or deny permission using the GUI.

If in decision 704 it is determined that permission is not granted for scanning the client device, then method 700 may proceed with operation 706, where sensitive file access is disabled. In one embodiment, the client device may continue to synchronize and share non-sensitive files using the file synchronization and share system, but the client device may be unable to synchronize and share sensitive files using the system.

If in decision 704 it is determined that permission is granted for scanning the client device, then method 700 may proceed with operation 708, where the client device is scanned to determine operating system (OS) security measures implemented by the client device. For example, the client device may be scanned to determine security measures that must be followed to access an OS of the client device.

Further still, method 700 may proceed with operation 710, where the client device is also scanned to determine file synchronization and sharing application security measures implemented by the client device. For example, the client device may be scanned to determine security measures that must be followed to access the file synchronization and sharing application of the client device.

Also, method 700 may proceed with operation 712, where a security level is determined for the device, based on the OS and file synchronization and sharing application security measures implemented by the client device. In one embodiment, the security level for the device may be selected from a plurality of predetermined levels (e.g., high, medium, low, etc.). In this way, access to sensitive data may be provided or withheld from the client device, based on the security level determined for the client device.

Figure 8:
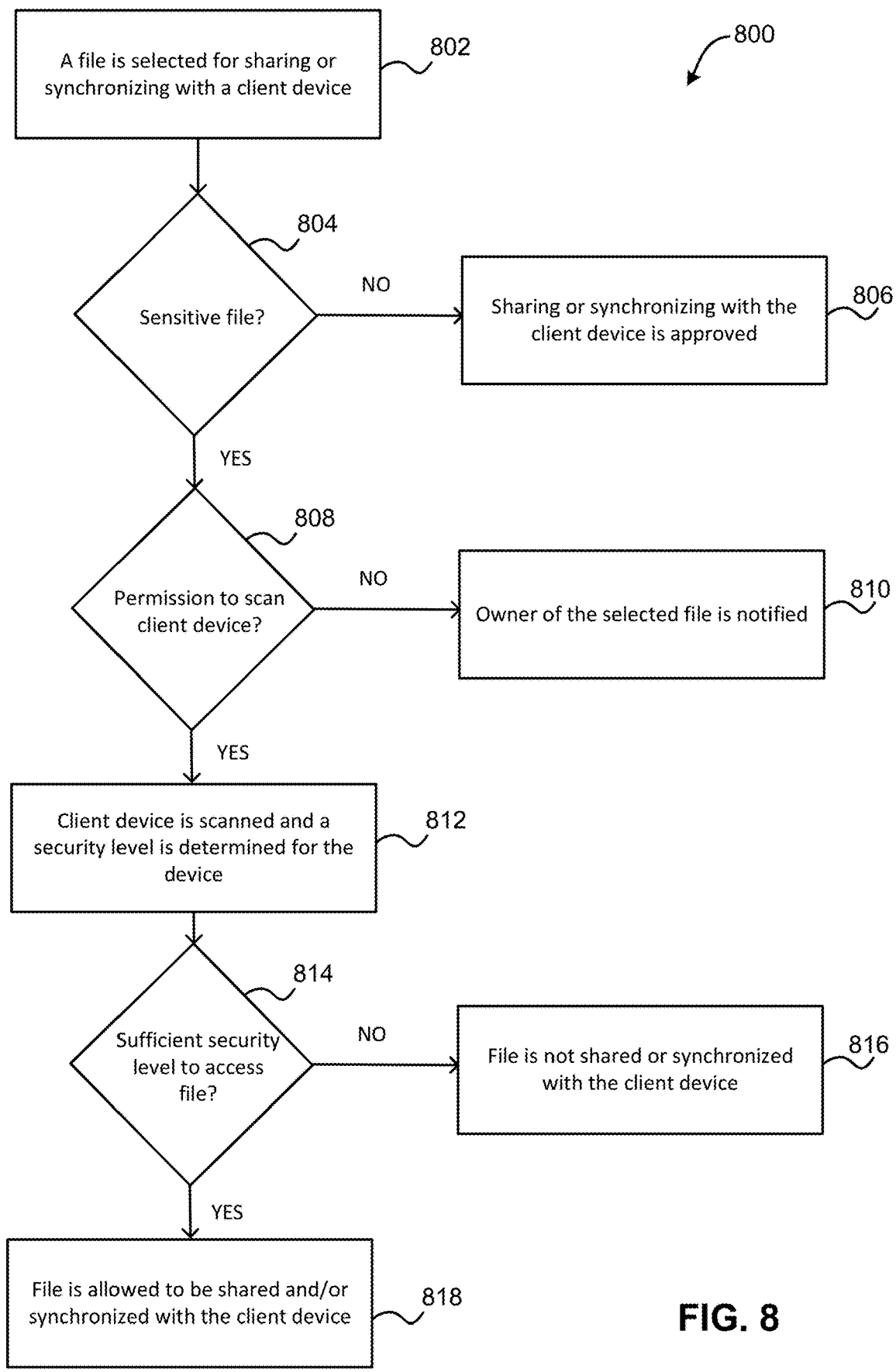
FIG. 8 illustrates a method for implementing file sharing security, in accordance with one embodiment.

Now referring to FIG. 8, a flowchart of a method 800 for implementing file sharing security is shown according to one embodiment. The method 800 may be performed in accordance with the present invention in any of the environments depicted in FIGS. 1-3 and 5, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a file is selected for sharing or synchronizing with a client device. For example, the file may be located at a first user account of a file synchronization and sharing system, and the client device may be associated with a second user account of the system that is different from the first user account. Additionally, method 800 may proceed with decision 804, where it is determined whether the selected file is sensitive. For example, it may be determined whether the selected file is determined to be one or more of important and confidential.

If it is determined in decision 804 that the selected file is not sensitive, then method 800 may proceed with operation 806, where sharing or synchronizing with the client device is approved. If it is determined in decision 804 that the selected file is sensitive, then method 800 may proceed with decision 808, where it is determined whether permission has been granted to scan the client device. If it is determined in decision 808 that permission has not been granted to scan the client device, then method 800 may proceed with operation 810, where an owner of the selected file is notified.

In one embodiment, the owner of the selected file may be informed (e.g., via a pop up message on a GUI, via an email or text message, etc.) that permission has not been granted to scan the client device. The user may then be given an option to deny or allow sharing or synchronizing the file with the client device, and the file may be conditionally shared and/or synchronized based on a selection made by the user.

If it is determined in decision 808 that permission has been granted to scan the client device, then method 800 may proceed with operation 812, where the client device is scanned and a security level is determined for the device. Further, method 800 may proceed with decision 814, where it is determined whether the security level for the client device is sufficient to access the file. For example, the security level for the client device may be compared to a threshold level that is needed to access the file.

If it is determined in decision 814 that the security level for the client device is not sufficient to access the file, then method 800 may proceed with operation 816, where the file is not shared or synchronized with the client device. In one embodiment, the client device may be notified of such failure, as well as one or more devices of an owner of the file. The client device may also be sent information indicating one or more changes that may be made to the security measures implemented by the client device, where these changes may allow for the device to have access to the file. After the changes have been made, another attempt at sharing or synchronizing the file with the client device may be made.

If it is determined in decision 814 that the security level for the client device is sufficient to access the file, then method 800 may proceed with operation 818, where the file is allowed to be shared and/or synchronized with the client device.

In this way, a framework may be integrated with a traditional file sync and share application infrastructure that offers a secure way of file sharing by identifying the importance/confidentiality of a file which is going to be shared, as well as assessing the security/access login mechanism of the opponent. These two inputs may then be used to make a decision whether to allow or deny or warn a user (who is sharing the file) related to the insecure target as well as pass the appropriate security level to be configured (on the target account/device) in response to accepting the share. This may enable secure file sharing between multiple accounts as well as secure file synchronization across various devices in a single account.

Figure 9:
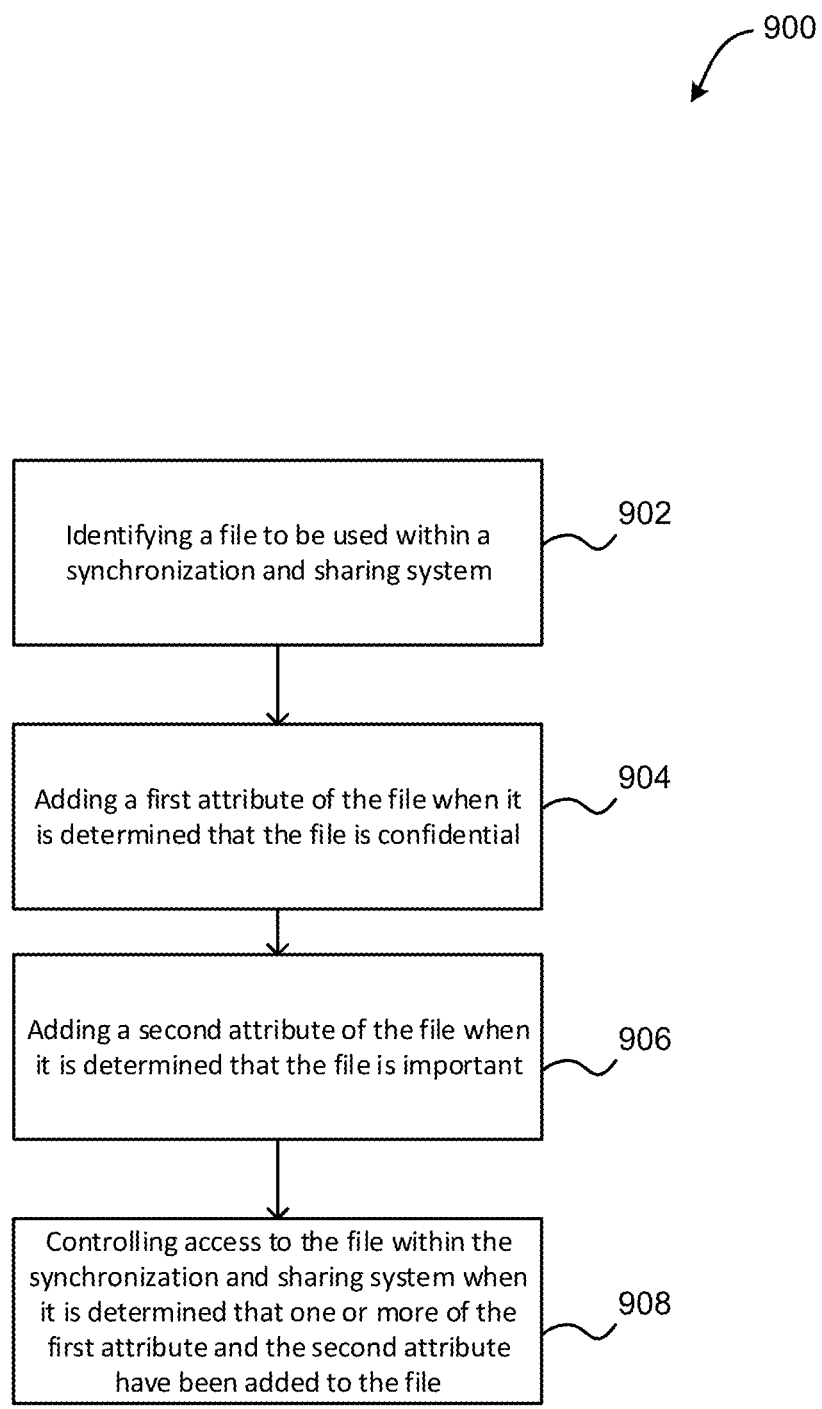
FIG. 9 illustrates a method for performing file analysis, in accordance with one embodiment.

Now referring to FIG. 9, a flowchart of a method 900 for performing file analysis is shown according to one embodiment. The method 900 may be performed in accordance with the present invention in any of the environments depicted in FIGS. 1-3 and 5, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a file to be used within a synchronization and sharing system is identified. Additionally, method 900 may proceed with operation 904, where a first attribute of the file is added when it is determined that the file is confidential. Further, method 900 may proceed with operation 906, where a second attribute of the file is added when it is determined that the file is important.

Further still, method 900 may proceed with operation 908, where access to the file is controlled within the synchronization and sharing system when it is determined that one or more of the first attribute and the second attribute have been added to the file.

Figure 10:
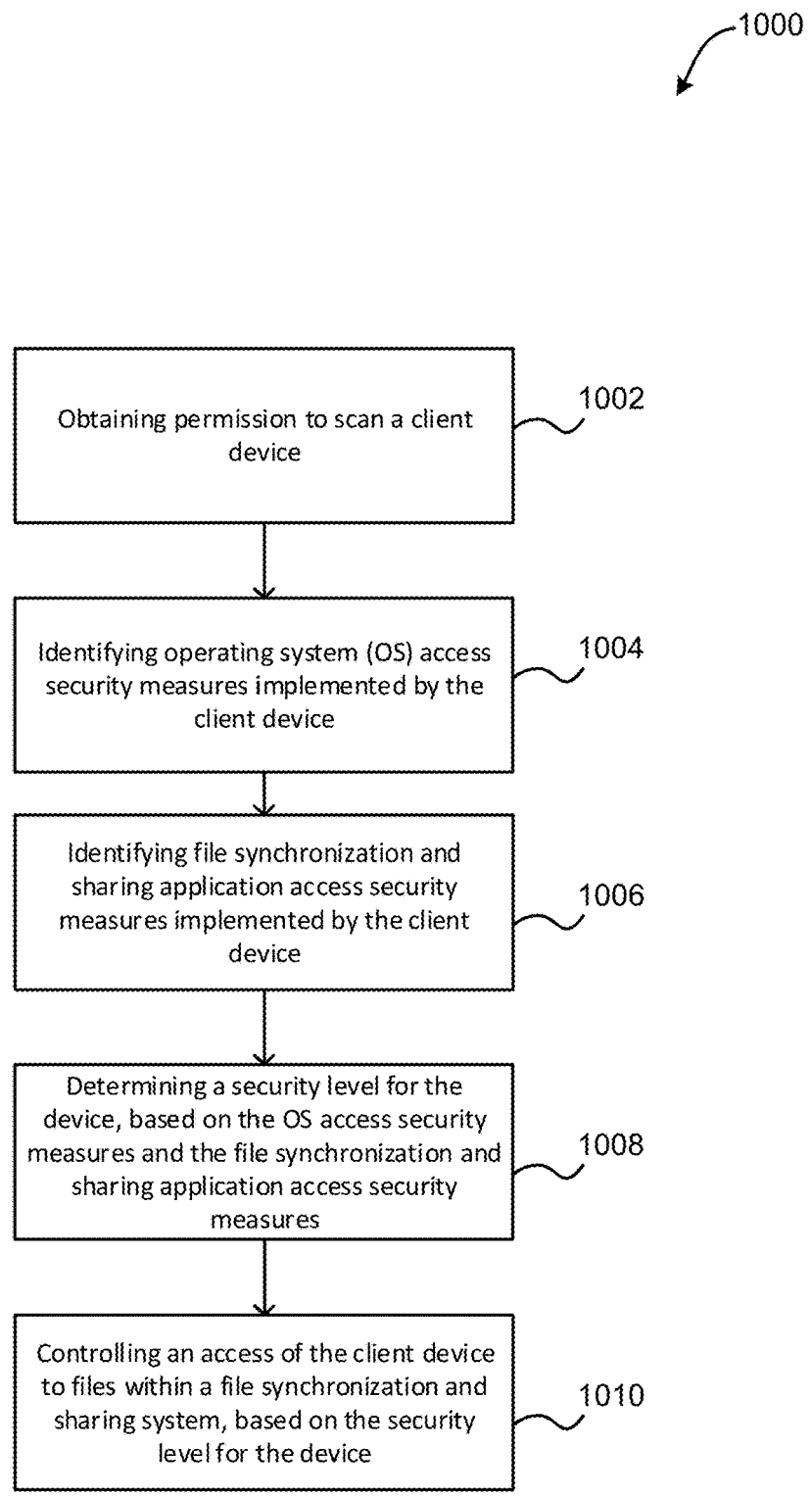
FIG. 10 illustrates a method for performing device analysis, in accordance with one embodiment.

Now referring to FIG. 10, a flowchart of a method 1000 for performing device analysis is shown according to one embodiment. The method 1000 may be performed in accordance with the present invention in any of the environments depicted in FIGS. 1-3 and 5, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where permission to scan a client device is obtained. Additionally, method 1000 may proceed with operation 1004, where operating system (OS) access security measures implemented by the client device are identified. Further, method 1000 may proceed with operation 1006, where file synchronization and sharing application access security measures implemented by the client device are identified.

Further still, method 1000 may proceed with operation 1008, where a security level for the device is determined, based on the OS access security measures and the file synchronization and sharing application access security measures. Also, method 1000 may proceed with operation 1010, where an access of the client device to files within a file synchronization and sharing system is controlled, based on the security level for the device.

Figure 11:
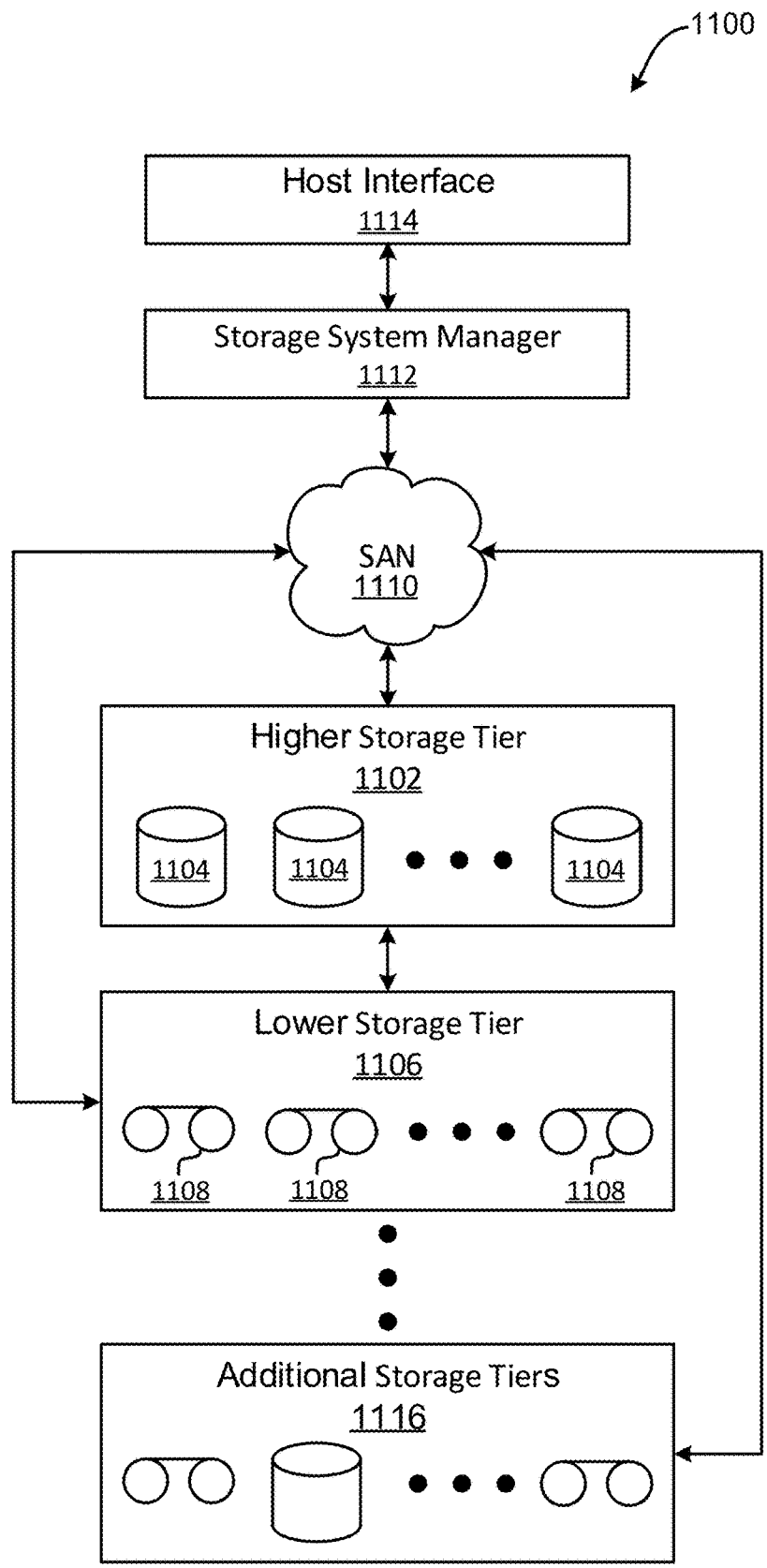
FIG. 11 illustrates a tiered data storage system in accordance with one embodiment.

Now referring to FIG. 11, a storage system 1100 is shown according to one embodiment. Note that some of the elements shown in FIG. 11 may be implemented as hardware and/or software, according to various embodiments. The storage system 1100 may include a storage system manager 1112 for communicating with a plurality of media on at least one higher storage tier 1102 and at least one lower storage tier 1106. The higher storage tier(s) 1102 preferably may include one or more random access and/or direct access media 1104, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1106 may preferably include one or more lower performing storage media 1108, including sequential access media such as magnetic tape in tape drives and/or optical media, slower accessing HDDs, slower accessing SSDs, etc., and/or others noted herein or known in the art. One or more additional storage tiers 1116 may include any combination of storage memory media as desired by a designer of the system 1100. Also, any of the higher storage tiers 1102 and/or the lower storage tiers 1106 may include some combination of storage devices and/or storage media.

The storage system manager 1112 may communicate with the storage media 1104, 1108 on the higher storage tier(s) 1102 and lower storage tier(s) 1106 through a network 1110, such as a storage area network (SAN), as shown in FIG. 11, or some other suitable network type. The storage system manager 1112 may also communicate with one or more host systems (not shown) through a host interface 1114, which may or may not be a part of the storage system manager 1112. The storage system manager 1112 and/or any other component of the storage system 1100 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1100 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1102, may include a majority of SSD storage media for storing data in a higher performing storage environment, and remaining storage tiers, including lower storage tier 1106 and additional storage tiers 1116 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1102, while data not having one of these attributes may be stored to the additional storage tiers 1116, including lower storage tier 1106. Of course, one of skill in the art, upon reading the present descriptions, may devise many other combinations of storage media types to implement into different storage schemes, according to the embodiments presented herein.

According to some embodiments, the storage system (such as 1100) may include logic configured to receive a request to open a data set, logic configured to determine if the requested data set is stored to a lower storage tier 1106 of a tiered data storage system 1100 in multiple associated portions, logic configured to move each associated portion of the requested data set to a higher storage tier 1102 of the tiered data storage system 1100, and logic configured to assemble the requested data set on the higher storage tier 1102 of the tiered data storage system 1100 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    adding a first attribute to predetermined data in response to determining that the predetermined data is confidential, based on a time and date that the predetermined data was generated, and an inclusion of predetermined information in the predetermined data;
    adding a second attribute to the predetermined data in response to determining that the predetermined data is important, based on a number of times the predetermined data has been viewed;
    receiving a request to provide access to the predetermined data to a device; and
    conditionally providing access to the predetermined data to the device, based on a current security level for the device, in response to determining that the first attribute and the second attribute have been added to the predetermined data.

2. The computer-implemented method of claim 1, wherein the predetermined data is stored at a file sharing and synchronizing system implemented within a cloud computing environment.

3. The computer-implemented method of claim 1, wherein the determining that the predetermined data is important is further based on:
    a number of times an owner of the predetermined data has viewed the predetermined data,
    a sharing of the predetermined data utilizing social media,
    an existence of multiple versions of the predetermined data, and
    an existence of a tag indicating that the predetermined data is important.

4. The computer-implemented method of claim 1, wherein the determining that the predetermined data is confidential is further based on:
    an identification that the predetermined data includes sensitive personal information, and
    an existence of a tag indicating that the predetermined data is confidential.

5. The computer-implemented method of claim 1, further comprising marking the predetermined data as sensitive in response to determining that the first attribute and the second attribute have been added to the predetermined data.

6. The computer-implemented method of claim 1, wherein the request is received at a synchronization client of a second device, and the request includes a request to provide access to a synchronization client of a first device as part of an automatic synchronization between the first device and the second device.

7. The computer-implemented method of claim 1, wherein the current security level for the device is calculated by collecting security and login mechanisms used to access an operating system (OS) of the device.

8. The computer-implemented method of claim 1, wherein the current security level for the device is calculated by collecting security and login mechanisms used to access a file sharing and synchronizing client of the device.

9. The computer-implemented method of claim 1, wherein the current security level of the device is calculated by rating security and login mechanisms used to access an OS of the device and a file sharing and synchronizing client of the device.

10. The computer-implemented method of claim 1, wherein:
    the predetermined data is shared with the device in response to determining that the current security level of the device exceeds a predetermined threshold; and
    the predetermined data is not shared with the device in response to determining that the current security level of the device does not meet the predetermined threshold.

11. The computer-implemented method of claim 10, wherein in response to determining that the predetermined data is not shared with the device, a user account associated with the device is given details of the current security level of the device, as well as one or more suggestions on how to improve the current security level of the device.

12. A computer program product for implementing data security within a synchronization and sharing environment, the computer program product comprising a computer readable storage medium having program instructions embodied therewith, wherein the computer readable storage medium is not a transitory signal per se, the program instructions executable by a processor to cause the processor to perform a method comprising:
    adding, utilizing the processor, a first attribute to predetermined data in response to determining that the predetermined data is confidential, based on a time and date that the predetermined data was generated, and an inclusion of predetermined information in the predetermined data;
    adding, utilizing the processor, a second attribute to the predetermined data in response to determining that the predetermined data is important, based on a number of times the predetermined data has been viewed;
    receiving, utilizing the processor, a request to provide access to the predetermined data to a device; and
    conditionally providing, utilizing the processor, access to the predetermined data to the device, based on a current security level for the device, in response to determining that the first attribute and the second attribute have been added to the predetermined data.

13. The computer program product of claim 12, wherein the predetermined data is stored at a file sharing and synchronizing system implemented within a cloud computing environment.

14. The computer program product of claim 12, wherein the determining that the predetermined data is important is further based on:
    a number of times an owner of the predetermined data has viewed the predetermined data,
    a sharing of the predetermined data utilizing social media,
    an existence of multiple versions of the predetermined data, and
    an existence of a tag indicating that the predetermined data is important.

15. The computer program product of claim 12, wherein the determining that the predetermined data is confidential is further based on:
- an identification that the predetermined data includes sensitive personal information, and
- an existence of a tag indicating that the predetermined data is confidential.

16. The computer program product of claim 12, wherein the current security level for the device is calculated by requesting permission to identify security and access mechanisms of the device, utilizing the processor.

17. The computer program product of claim 12, wherein the current security level for the device is calculated by collecting security and login mechanisms used to access an operating system (OS) of the device, utilizing the processor.

18. The computer program product of claim 12, wherein the current security level for the device includcsis calculated by collecting security and login mechanisms used to access a file sharing and synchronizing client of the device, utilizing the processor.

19. The computer program product of claim 12, wherein the current security level of the device is calculated by rating security and login mechanisms used to access an OS of the device and a file sharing and synchronizing client of the device, utilizing the processor.

20. The computer program product of claim 12, wherein:
- the predetermined data is shared with the device in response to determining, utilizing the processor, that the current security level of the device exceeds a predetermined threshold; and
- the predetermined data is not shared with the device in response to determining, utilizing the processor, that the current security level of the device does not meet the predetermined threshold.

21. The computer program product of claim 20, wherein in response to determining that the predetermined data is not shared with the device, a user account associated with the device is given details of the current security level of the device, as well as one or more suggestions on how to improve the current security level of the device.

22. A system, comprising:
- a hardware processor; and
- logic integrated with the processor, executable by the processor, or integrated with and executable by the processor, the logic being configured to:
- add a first attribute to predetermined data in response to determining that the predetermined data is confidential, based on a time and date that the predetermined data was generated, and an inclusion of predetermined information in the predetermined data;
- add a second attribute to the predetermined data in response to determining that the predetermined data is important, based on a number of times the predetermined data has been viewed;
- receive a request to provide access to the predetermined data to a device; and
- conditionally provide access to the predetermined data to the device, based on a current security level for the device, in response to determining that the first attribute and the second attribute have been added to the predetermined data.

23. A computer-implemented method, comprising:
- identifying a file to be used within a synchronization and sharing system;
- adding a first attribute to the file in response to determining that the file is confidential, based on a time and date that the file was generated, and an inclusion of predetermined information in the file;
- adding a second attribute to the file in response to determining that the file is important, based on a number of times the file has been viewed; and
- controlling access to the file within the synchronization and sharing system in response to determining that the first attribute and the second attribute have been added to the file, where controlling access to the file includes conditionally providing access to the file to a device, based on a current security level for the device.

24. A computer-implemented method, comprising:
- obtaining permission to scan a client device;
- identifying operating system (OS) access security measures implemented by the client device;
- identifying file synchronization and sharing application access security measures implemented by the client device;
- determining a security level for the client device, based on the OS access security measures and the file synchronization and sharing application access security measures, including assigning a rating to each of the OS access security measures implemented by the client device and each of the file synchronization and sharing application access security measures implemented by the client device, where the OS access security measures and the file synchronization and sharing application access security measures include password confirmation, biometric information confirmation, image analysis and confirmation, authentication key confirmation, and voice confirmation;
- identifying one or more files within a file synchronization and sharing system as sensitive in response to analyzing a plurality of factors associated with a generation and a content of the one or more files, the factors including an existence of one or more replicas of the one or more files; and
- controlling an access of the client device to the one or more files within the file synchronization and sharing system, based on the security level for the client device.

* * * * *